United States Patent Office.

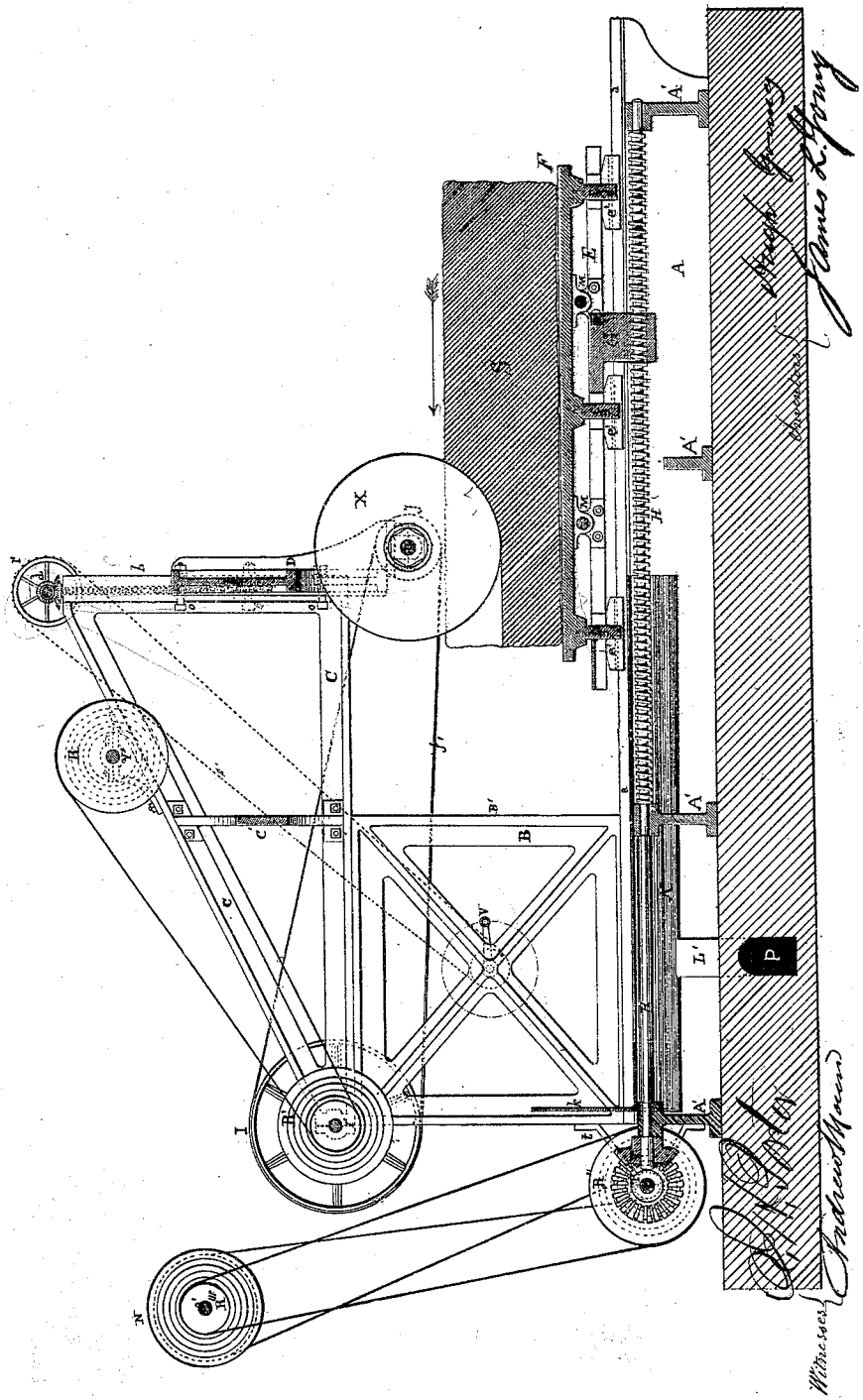

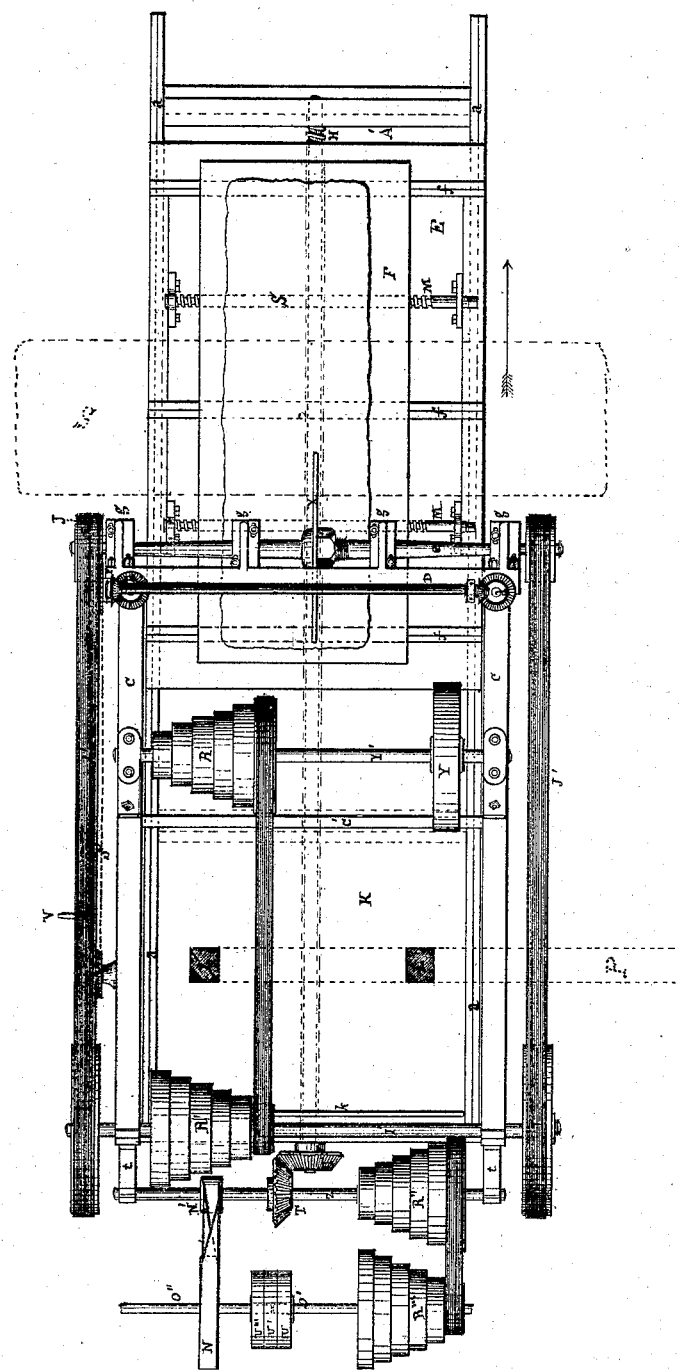

HUGH YOUNG, OF MIDDLETOWN, CONNECTICUT, AND JAMES L. YOUNG, OF NEW YORK, N. Y.

Letters Patent No. 99,513, dated February 1, 1870.

IMPROVEMENT IN STONE-CUTTING MACHINES.

The Schedule referred to in these Letters Patent and making part of the same

*To all whom it may concern:*

Be it known that we, HUGH YOUNG, of Middletown, in the county of Middlesex, State of Connecticut, and JAMES L. YOUNG, of New York city, in the county of New York, and State of New York, have invented certain new and useful Improvements in Stone-Cutting Machinery; and we do hereby declare that the following is a full and exact description thereof, reference being had to the accompanying drawings, and to the letters of reference marked thereon.

This invention relates to a machine for cutting stone by means of a circular saw or milling-tool, protected by mineral carbon, or other hard stones, or by points of chrome-steel, or other hard steels; and It consists in the arrangement and combination of the different parts of the machine with each other, and with said saw or milling-tool, whereby a novel, efficient, and useful tool is obtained.

Plate I represents a sectional elevation of our improved stone-cutting machine, through its longitudinal centre, and Plate II represents a plan or bird's-eye view of the same.

A is a strong metallic base-frame, built much in the same manner as the frame of a metal-planer; being composed of two pieces A A, with top edges $a\ a$, V-shaped, to act as a slide-way, and cross-pieces A' A' A' A', to form the frame.

B B are two upright frames, bolted or otherwise fastened to the frame A, and supporting the triangular frames C C, which, being fastened in a permanent manner to the top part of the frames B, and stayed by the piece C', are held in a perfectly immovable position.

The frames C C project over and beyond the edge or face B' of the pieces B, all the distance required for the special purpose of the machine, so as to allow of a long stone being placed across said machine, (as indicated by dotted lines on plan,) and to move said stone freely under the saw, when it is desired to run a cut across said stone.

The front edges or vertical edges of the piece C C are shaped so as to form proper guides or slides $b\ b$, to receive and guide, in a true vertical plane, a frame-piece, D, which, by means of suitable screws and gears $d\ d$, is made to rise and fall at pleasure in said vertical plane, having always its lower edge parallel to the bed of the machine.

The screws and gears $d\ d$ may be worked by means of the chain S' and hand-crank V, or by any other suitable devices, so as to be controlled by the operator of the machine.

Whenever the frame-piece D is brought to the proper height for the special work in view, it is made fast to the frames C C, by suitable screws, screw-bolts, or hooks $o\ o\ o$, or by any other device, which will answer the purpose of making the frame-piece D fast and stationary against the vertical edges of the frames C C.

The lower part of the frame-piece D is provided with four projections $g\ g\ g\ g$, to the under part of which are fastened pillow-blocks, of suitable construction to receive the shaft $e$, upon which is mounted the circular saw or milling-tool X. These pillow-blocks are made adjustable in their position under the projections $g$, by means of slotted bolt-holes, set-screws, or wedges, or by proper fillers, so that at any time the shaft $e$ can be brought again in mathematically true right angle to the plane of motion of the table E and F upon the slides $a\ a$ of the frame A. This regulating of the position of the shaft $e$ is of great importance, to obtain a motion of the saw which will produce a true and neat cut, free from side and back scratches.

The shaft $e$ is of a larger diameter in the middle part than at both ends, to insure greater rigidity and steady motion, with the smallest amount of friction, and the saw or milling-tool X is fastened at or about at the middle of the shaft, to which the motion is given by two pulleys J J, one at each end of the said shaft $e$.

X is the circular saw or milling-tool, protected by mineral carbon or other hard stones, or by points of chrome-steel, or other hard steels, which may be made of any approved construction or pattern, and must be fastened to the middle part of the shaft $e$, in a substantial and permanent manner.

I I are large pulleys, mounted upon the two ends of the shaft I', and corresponding to the two pulleys J J, with which they are connected by suitable belts J' J'.

Y is the pulley, upon which the belt for giving motion to the circular saw is to be run, and, when desired, there may be a fast and a loose pulley in that place, to render the machine independent in its action from other tools in the shop.

Y' is a countershaft, upon which the pulley Y is mounted, and which bears also the cone R, formed of a series of pulleys of suitable size.

R' is a cone, corresponding to and put in communication with the cone R, so that the arrangement of the pulley Y, cones R R', pulleys I I, and pulleys J J, are contrived and combined to obtain, with a given speed of the pulley Y, any speed desired for the special work for which the circular saw or milling-tool X may be used.

E is a table or bed, supported upon slide-pieces $e'\ e'\ e'\ e'$, which fit upon the V-shaped slide-way of the pieces A, and may be run in a true horizontal plane of motion upon the same.

F is a second table or bed, resting upon slides $f\ f\ f$, which are fastened to the table E, at right angle with its line of motion, in such a manner as to obtain for the table F a horizontal sliding motion crosswise upon the table E.

M M are screws, for moving the table F upon the slides $fff$, and for retaining it stationary thereon, when required. These screws may be connected by gearings, so as to have them work in a simultaneous manner, and obtain a better motion of the table F.

H is a long screw, located between the two pieces A of the main frame, and mounted in suitable journals, fastened to the cross-pieces A' of the said frame. This screw H passes through a nut, G, which is made fast to the table E, and when the screw H is turned "with the sun," it will move the nut G and table E in the direction of the arrow of plate I, (which we call forward motion,) and when the screw H is turned "against the sun," it will move the table E backward, or in the direction of the arrow in Plate II.

The screw H receives its motion from the mitre-gears T T and the shaft Z, which, in turn, receives its motion in one or the other direction from the cone R''', or from the pulley N'.

The shafts $o'$ and $o''$ are mounted end to end on a line, in suitable bearings, to render them independent from each other, and they have a common set of fast and loose pulleys V V' V'' between them so that the same belt may put either of the shafts $o'$ or $o''$ in motion, leaving the other shaft free.

Both the shafts $o'$ and $o''$ move at a given speed, and in order to obtain a variable feed-motion for the table E, the double set of cone-pulleys R'' R''' is employed on shaft $o'$ side, and for running back the table E, the pulleys N and N' are employed on the shaft $o''$ side.

By this arrangement, the feed-motion, being adjusted by shifting the belt upon the set of cones R'' R''', the mere shifting the belt upon the pulleys V, V', or V'', will either feed the stone S forward to the saw X, stop said feed, or run the stone back.

We attach great importance to this minute regulation of the feed, or forward motion of the table E, and to the use therefor of a combination of belts and screw, as the constant, yet not positive feed obtained thereby, always keeps the work to the saw, not allowing any chance for clogging, or for breaking the carbon cutters, as is the case in an intermittent and positive feed-motion.

K is an apron or covering, extending all over the part of the machine which is not covered by the tables E and F. This apron K is raised at centre, to clear the screw H, and is depressed on both sides, to form gutters for collecting the drainage of water and of stone-grinding thrown off by the saw in the process of cutting.

At the lowest parts of the apron K are located drain-pipes L', which may connect with the sewer P, and the pipe or pipes L' are provided with suitable strainers, sieves, or perforated or porous diaphragms L in order to allow of the passage through them of the water and stone-grinding, and yet retain any small fragments of mineral carbon, which may become detached, be broken off from, or be thrown off from the saw X.

$k$ is an upright apron, which may receive other movable aprons, and is intended to catch any boring, grinding, or fragments of stones, and all the water projected in that direction by the saw X, and bring down and convey the same to the apron K.

From the full and detailed description we have given of our improved stone-cutting machine, its operation will be easily understood.

The stone S being laid upon or fastened to the table F, and this table being adjusted by the screws M M, so as to bring the stone in proper relation to the saw, the saw X being lowered to the desired place for the intended cut, and all the parts being firmly and rigidly fastened, the operator adjusts the feed by the cones R'' R''', and the speed of the saw by the cones R R', as already explained, and the saw is put in motion.

When the saw has reached its speed, and is working steadily, the feed-motion is started by shifting the belt upon the pulley V, and the stone is fed in the direction of the arrow on Plate I, until the cut is finished, when, by shifting the belt upon pulley V', the feed-motion is stopped, and by shifting it further upon the pulley V'', the stone retraces its steps, and may be adjusted for another cut.

What we claim as our invention, and desire to secure by Letters Patent of the United States, is—

1. The projecting or overhanging frame C C, in combination with the upright frames B B and main frame A, arranged in the manner and for the purpose set forth.

2. The vertical frame D, with its parts $g g g g$, and adjustable pillow-blocks, in combination with the projecting frames C C, and saw or milling-tool X, substantially as described.

3. The combination of the saw or milling-tool X, when provided with the shaft $e$, pulleys J J and I I, with the tables E and F, and their feeding-device, composed of the screw H, nut G, gearings T T, shaft Z, and cones R'' R''', substantially as and for the purpose set forth.

4. The screens, sieves, strainers, or porous diaphragms, L, in combination with the apron K and the saw or milling-tool X, for the purpose herein set forth.

HUGH YOUNG. [L. S.]
JAMES L. YOUNG. [L. S.]

Witnesses:
J. H. PORTER,
ANDREW MAIN.